United States Patent
Kavalipati et al.

(10) Patent No.: US 8,839,164 B2
(45) Date of Patent: Sep. 16, 2014

(54) POWER STATE TRANSITION VERIFICATION FOR ELECTRONIC DESIGN

(75) Inventors: Paparao S. Kavalipati, Beaverton, OR (US); Andrew Seawright, Lake Oswego, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/600,074

(22) Filed: Aug. 30, 2012

(65) Prior Publication Data
US 2013/0232460 A1 Sep. 5, 2013

Related U.S. Application Data

(63) Continuation of application No. 12/534,158, filed on Aug. 3, 2009, now abandoned.

(60) Provisional application No. 61/086,117, filed on Aug. 4, 2008, provisional application No. 61/230,750, filed on Aug. 3, 2009.

(51) Int. Cl.
*G06F 17/50* (2006.01)

(52) U.S. Cl.
USPC .......................................... 716/106; 716/109

(58) Field of Classification Search
USPC ................. 716/100–101, 106, 109, 118–120, 716/132–133
See application file for complete search history.

(56) References Cited

U.S. PATENT DOCUMENTS

| | | | | |
|---|---|---|---|---|
| 7,152,216 B2 * | 12/2006 | Kapoor et al. | ................. | 716/103 |
| 7,249,835 B2 * | 7/2007 | Hoshino et al. | ............... | 347/102 |
| 7,574,683 B2 * | 8/2009 | Wilson et al. | ................. | 716/100 |
| 7,712,061 B2 * | 5/2010 | Kapoor et al. | ................. | 716/106 |
| 7,770,142 B1 * | 8/2010 | Shmayovitsh et al. | ....... | 716/109 |
| 7,954,078 B1 * | 5/2011 | Wang et al. | .................... | 716/127 |
| 7,958,475 B2 * | 6/2011 | Khan | ............................ | 716/109 |
| 2006/0156145 A1 * | 7/2006 | Mitra et al. | .................... | 714/742 |
| 2007/0005329 A1 * | 1/2007 | Alfieri | ............................. | 703/19 |
| 2007/0044044 A1 * | 2/2007 | Wilson et al. | ..................... | 716/1 |
| 2007/0245285 A1 * | 10/2007 | Wang et al. | ..................... | 716/10 |
| 2008/0098338 A1 * | 4/2008 | Kapoor et al. | ..................... | 716/5 |
| 2008/0127015 A1 * | 5/2008 | Chandramouli et al. | ........ | 716/5 |
| 2009/0089725 A1 * | 4/2009 | Khan | ................................ | 716/5 |
| 2009/0276742 A1 * | 11/2009 | Wilson et al. | ..................... | 716/5 |
| 2010/0064271 A1 * | 3/2010 | Chen | ................................ | 716/5 |

* cited by examiner

*Primary Examiner* — Stacy Whitmore (57) ABSTRACT

Various implementations of the invention may be applied to generate an auxiliary verification statement. The auxiliary verification statement defines properties that check if the power domains are active at appropriate times is generated. Particularly, the auxiliary verification statement checks to ensure that power domain transitions do not interfere with the operation of the device design. With various implementations of the invention, an auxiliary verification statement may be generated by first determining a set of properties instantiated in a verification statement and then synthesizing the auxiliary verification statement based upon the determined properties, the corresponding device design and the power domains. In some implementations, the auxiliary verification statement instantiates properties that check if the power domains related to the properties in the verification statement are active when the verifications statement is exercised. In various implementations, this is accomplished by substituting select ones of the properties in the verification statement with select properties corresponding to the power domain.

14 Claims, 9 Drawing Sheets

```
case (a_state)
  IDLE: begin
    if (a_req) begin
      a_rst     <= 1'b1;
      a_pwr_on  <= 1'b1;
      a_state   <= INIT;
    end
  end
  INIT: begin
    a_rst     <= 1'b1;
    a_state   <= RUN;
    a_pwr_on  <= 1'b1;
  end
  RUN: begin
    a_rst     <= 1'b0;
    a_pwr_on  <= 1'b1;
    if (!a_busy && !a_req &&
        (a_idle_count > A_LIMIT))
    begin
      a_state   <= OFF;
    end
  end
  OFF: begin
    a_pwr_on  <= 1'b0;
    if (a_req) begin
      a_state  <= IDLE;
      a_pwr_on <= 1'b1;
      a_rst    <= 1'b1;
    end
  end
  default: begin
    a_rst     <= 1'b1;
    a_pwr_on  <= 1'b1;
    a_state   <= IDLE;
  end
endcase
```

*FIG. 9*

```
create_power_domain ma_PD \
  -elements { UTOP/UA }
create_supply_port ma_ppwr  -domain ma_PD
create_supply_net  ma_vnet  -domain ma_PD
create_supply_port ma_pgnd  -domain ma_PD
create_supply_net  ma_gnet  -domain ma_PD
create_supply_net  ma_OPWR  -domain ma_PD
connect_supply_net ma_vnet \
  -ports { ma_ppwr }
connect_supply_net ma_gnet \
  -ports { ma_pgnd }
set_domain_suppy_net ma_PD \
   -primary_power_net ma_vnet \
   -primary_ground_net ma_gnet \
create_power_switch ma_SW \
   -domain ma_PD \
   -output_supply_port \
      { ma_out_sw ma_OPWR } \
   -input_supply_port \
      { ma_in_sw ma_vnet } \
   -control_port \
      { ma_ctr_sw a_pwr_on } \
   -on_state \
      {ma_ON ma_in_sw {ma_ctr_sw}}\
   -off_state { ma_OFF { !ma_ctr_sw }}
```

POWER STATE TRANSITION VERIFICATION FOR ELECTRONIC DESIGN

RELATED PATENT APPLICATIONS

The present application is a continuation of and claims priority under 35 U.S.C. §120 to U.S. patent application Ser. No. 12/534,158, entitled "Power State Transition Verification For Electronic Design," filed on Aug. 3, 2009, and naming Paparao Kavalipati and Andrew Seawright as inventors, which application in turn claimed priority under 35 U.S.C. §119 to U.S. Provisional Patent Application No. 61/086,117, entitled "Formal Property Verification Of Low Power Designs," filed on Aug. 4, 2008 and naming Paparao Kavalipati and Andrew Seawright as inventors and to U.S. Provisional Patent Application No. 61/230,750, entitled "Formal Property Verification Of Low Power Designs," filed on Aug. 3, 2009 and naming Paparao Kavalipati and Andrew Seawright as inventors, each of which applications are incorporated entirely herein by reference.

FIELD OF THE INVENTION

The invention relates to the field of electronic design verification. More particularly, various implementations of the invention are applicable to verifying transitions between power states in an electronic design.

BACKGROUND OF THE INVENTION

Electronic circuits, such as integrated microcircuits, are used in a variety of products, from automobiles to microwaves to personal computers. Designing and fabricating microcircuit devices typically involves many steps, sometimes referred to as the "design flow." The particular steps of a design flow often are dependent upon the type of microcircuit, its complexity, the design team, and the microcircuit fabricator or foundry that will manufacture the microcircuit. Typically, software and hardware "tools" verify the design at various stages of the design flow by running software simulators and/or hardware emulators. These steps aid in the discovery of errors in the design, and allow the designers and engineers to correct or otherwise improve the design. These various microcircuits are often referred to as integrated circuits (IC's).

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit, i.e. that the logical design conforms to the specification. This analysis is sometimes referred to as "formal verification."

After the logical design is verified, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are then analyzed, often mathematically, to confirm that the circuit described by the device design conforms to the logical design, and as a result, the specification. This analysis is also sometimes referred to as formal verification. Additional verifications, such as for example timing and power verifications are often made at this stage, and may be included in the formal verification process.

Once the components and their interconnections are established, the design is again transformed, this time into a physical design that describes specific geometric elements. The geometric elements, which typically are polygons, define the shapes that will be created in various layers of material to manufacture the circuit. This type of design often is referred to as a "layout" design. The layout design is then used as a template to manufacture the integrated circuit. More particularly, the integrated circuit devices are manufactured, by for example an optical lithographic process, using the layout design as a template. During an optical lithography process, a photo-mask is used to transfer a geometric pattern from the photo-mask onto a substrate via a photo-resistive material. The geometric pattern in the photo-mask is designed such that the image or pattern transferred onto the substrate matches the geometric pattern of the layout design.

As indicated above, formal verification is used to ensure the design complies with the specification. The specification often defines properties and directives that collectively describe the expected behavior of the device. The specification of properties and directives is often done semantically. Various languages exist for defining properties and directives, such as for example Sugar, ForSpec, Property Specification Language (PSL), and System Verilog Assertions (SVA), among others. As stated above, the device design is often in the form of a hardware description language. Formal verification then either proves or disproves the properties and directives with respect to the design and the specification.

As modern device designs and specification are extremely complicated, computing devices, executing a formal verification toolset are often employed. These formal verification tools typically report out to the user which properties are proven true, and what properties can fail as well as what sequences of states in the design can cause the properties to fail.

As stated, modern designs are increasingly complex. Part of this complexity is manifest in low power designs, where different power supplies are used for differing parts of the design. For example, many modern electronic devices are capable of performing a multitude of functions. For example, a cell phone may include a camera in addition to the other components needed to transmit and receive voice communications. During times that the camera is not in use it may be desirable to turn off power to the image capture portions of the device, so as not to prematurely drain the battery or use excessive power. As a result, the device would need multiple power supplies or power switches capable of delivering power to one portion of the device while shutting of power delivery to another portion of the device. Often when a portion of a device is supplied power by a particular power supply, it is said that the portion of the device is "driven" by that particular power supply.

Portions of a device being "driven" by different power supplies are said to be in different power domains. Accordingly, the image capture portions of the design above would be in a different power domain than other portions of the design. Power domains, as well as other low power design techniques are further described in *Low Power Methodology*

*Manual For System-On-Chip Design*, by M. Keating et al., Springer 2007, which book is incorporated entirely herein by reference.

Various standards exist for the specification of low power design features. For example, the Unified Power Format (UPF) and the Common Power Format (CPF) are two such standards. Designs with multiple power supplies, and low power designs in particular have a functional specification and a power specification. The functional specification defines the behavior of the device while the power specification defines the power domains and power controller information. For low power designs, the basic functionality of the design as well as the low power features must be verified. The verification considers how the power supply network is created, how power supply nets behave as well as ensures that various scenarios of powering up and powering down different power domains do not interfere with the intended functionality of the design.

Various approaches to verifying low power designs are discussed in *Assertion-Based Verification For Power Cycled Systems-On-Chip*, by T. Anderson et al., Design and Verification Conference and Exhibition Proceedings, San Jose, Calif., Feb. 19-21, 2008, *To Retain Or Not To Retain: How Do I Verify The State Elements Of My Low Power Design?*, by S. Baily et al., Design and Verification Conference and Exhibition Proceedings, San Jose, Calif., Feb. 19-21, 2008, *Upping Verification Productivity Of Low Power Designs*, by G. Chidolue et al., Design and Verification Conference and Exhibition Proceedings, San Jose, Calif., Feb. 19-21, 2008, *Power Assertions And Coverage For Improving Quality Of Low Power Verification Closure Of Power Intent*, by N. Khan et al., Design and Verification Conference and Exhibition Proceedings, San Jose, Calif., Feb. 19-21, 2008, and *Static And Formal Verification Of Power Aware Designs At The RTL Using UPF*, by R. Mukherjee et al., Design and Verification Conference and Exhibition Proceedings, San Jose, Calif., Feb. 19-21, 2008, which articles are all incorporated entirely herein by reference.

The various approaches to verifying low power designs mentioned above all require modification to the functional specification. For example, the properties defined by the functional specification may be altered to explicitly state the power state information. However, this approach clutters the functional specification and particularly the properties. Additionally, this approach requires additional time and energy from the designer to modify the functional specification according to the power specification.

SUMMARY OF THE INVENTION

Implementations of the invention provide methods and apparatuses for verifying power state transitions within a device design. In various implementations of the invention, a device design having multiple power domains is identified. Additionally, a verification statement corresponding to the device design is identified. Subsequently, an auxiliary verification statement defining properties to check if the power domains are active at appropriate times is generated. The auxiliary verification statement may be used in conjunction with the verification statement to verify correct operation of the device design. Particularly, the auxiliary verification statement may be used to ensure that the power domain transitions do not interfere with the operation of the device design.

With various implementations of the invention, an auxiliary verification statement may be generated by first determining a set of properties instantiated in a verification statement and then synthesizing the auxiliary verification statement based upon the determined properties, the corresponding device design and the power domains. In some implementations, the auxiliary verification statement instantiates properties that check if the power domains related to the properties in the verification statement are active when the verifications statement is exercised. In various implementations, this is accomplished by substituting select ones of the properties in the verification statement with select properties corresponding to the power domain.

These and additional implementations of the invention will be further understood from the following detailed disclosure of illustrative embodiments.

BRIEF DESCRIPTION OF THE DRAWINGS

The present invention will be described by way of illustrative embodiments shown in the accompanying drawings in which like references denote similar elements, and in which.

DETAILED DESCRIPTION OF ILLUSTRATIVE IMPLEMENTATIONS

Although the operations of the disclosed techniques are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular techniques can be used in conjunction with other techniques. Additionally, the detailed description sometimes uses terms like "determine" to describe the disclosed techniques. Such terms are high-level abstractions of the actual operations that are performed. The actual operations that correspond to these terms will vary depending on the particular implementation and are readily discernible by one of ordinary skill in the art.

Some of the techniques described herein can be implemented by software stored on a computer readable storage medium, or executed on a computer. Additionally, some of the disclosed techniques may be implemented as part of a computer implemented electronic design automation (EDA) tool. The selected techniques could be executed on a single computer or a computer networked with another computer or computers. For clarity, only those aspects of the tools or computer germane to these disclosed techniques are described; product details well known in the art are omitted.

Formal Verification

Figure 1:
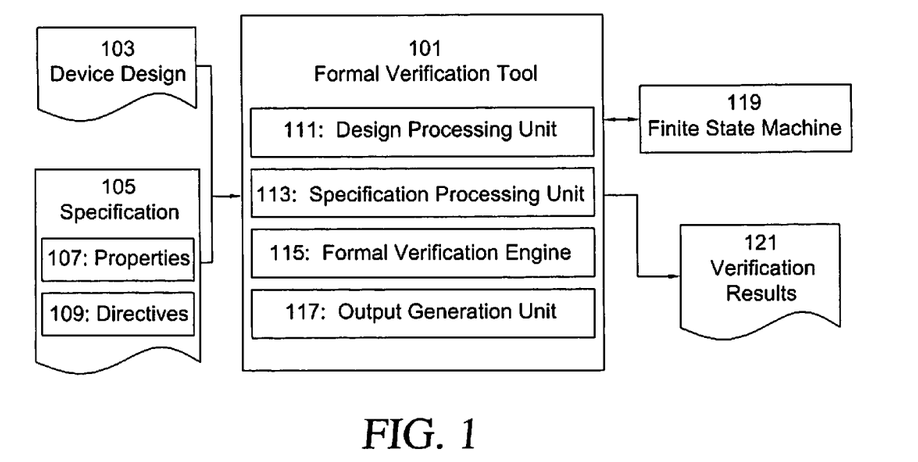
FIG. 1 shows an illustrative formal verification tool.

As the described techniques apply to formally verifying a low power device design, a general formal verification tool and process are described here. FIG. 1 illustrates a formal verification tool 101. The formal verification tool 101 may be employed to prove or disprove that the device design 103 conforms to the specification 105. As can be seen from this figure, the specification 105 includes a set of properties 107 and a set of directives 109. The set of properties 107 is a collection of logical and temporal relationships that combined represent a set of behavior, rules, or characteristics about the design 103. The set of directives 109 specify the specific actions to be taken to "check" the set of properties. For example, a common directive is the assert directive. The assert directive states that a given property is required to hold a given state, and directs the formal verification tool 101 to verify that the property does hold the given state. Various other directives, such as for example the cover directive or the assume directive, are available for checking selected properties. Those of skill in the art are familiar with properties and directive and the various languages available for declaring properties and directive. Accordingly, these are not reviewed here.

As further illustrated in FIG. 1, the formal verification tool 101 includes a design processing unit 111, a specification processing unit 113, a formal verification engine 115, and an output generation unit 117. The design processing unit 111 may access the design 103 and generate a finite state machine 119. In alternative implementations, other mathematical descriptions of the design, such as for example non-deterministic automata may be generated. The specification processing unit 113 may access the specification 105 and relate the set of properties 107 to selected portions of the finite state machine 119. The formal verification engine 115 takes the processed properties and directives and determines, often mathematically, if a directive is satisfied or not. More particularly, the formal verification engine 115 either proves or disproves ones of the set of directives 107 for the corresponding properties of the set of properties 105, based on the finite state machine 119. The output generation unit 117 generate a report that may be made available to the user, by for example storing in to a memory storage location or outputting to a visual display device. In various implementations, the output list the specific directives and which were proven true and which were proven false. In further implementations, for the directives proven false, a listing the states that cause the directive fail may be output as well.

As FIG. 1 illustrates, formal verification is typically applied to device designs. However, formal verification may be applied to already manufactured devices, such as for example a prototype device. The techniques described herein for verifying the power state transition of a device design are equally applicable to verification of a physical design. However, for purposes of brevity and clarity, a distinction between verification at the design level and at the physical level is not made in the balance of this disclosure. Furthermore, the term device may be used interchangeably to refer to a physical embodiment of the device as well as to models or representations of the device.

Low Power Designs

Figure 2:
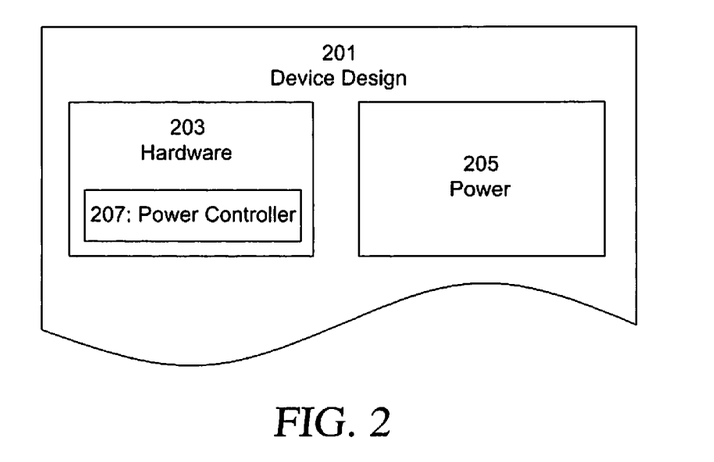
FIG. 2 a device design.

As discussed, electronic device designs, such as the device design 103, are often specified in a hardware description language. The hardware description language specifies the particular components that make up the design and their interconnections. Formal verification tools, such as the tool 101, may then determine the designs functionality based upon these specified component and their interconnections, by for example synthesizing the design. FIG. 2 illustrates a low power design 201. As can be seen form this figure, the low power design 201 includes a hardware component 203 and a power component 205. The hardware component 203 further includes a power controller component 207. In various implementations of the invention, the hardware component 203, including the power controller component 207 are described by System Verilog while the power component 205 is described by the unified power format standard.

Figure 3:
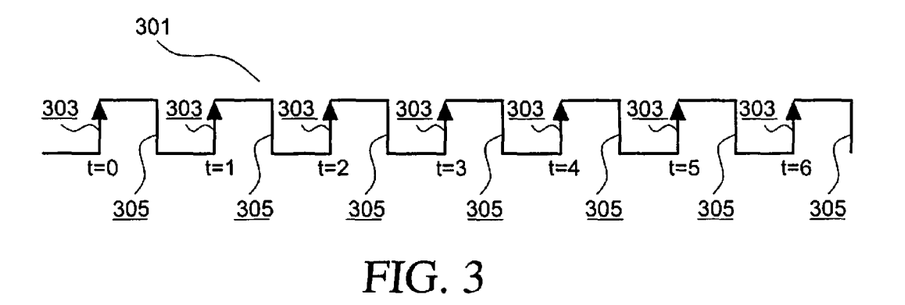
FIG. 3 illustrates a clock signal.

As those of skill in art can appreciate, the speed with which an electronic device operates is controlled by a clock. A modern device will typically include multiple clocks to control the device. FIG. 3 illustrates a clock 301. As can be seen from this figure, the clock 301 has 6 cycles (i.e. t=0 to t=6), with each cycle having a first clock edge 303 and a second clock edge 305. The first clock edges 303 are often referred to as the rising edge while the second clock edges 305 are often referred to as the falling edges. Clocks are used to both trigger elements within the device design as well as to synchronize the operation of various components within the design. A clock is said to be active if there exists elements within the design that are triggered on either of that clocks edges. Some clocks are active on both their rising and falling edges. Additionally, some elements may be triggered on both the rising and falling edges of a clock. For each clock edge within the design, a group of elements triggered on that particular clock edge may be identified. This group of elements may be referred to as belonging to the same "clock domain". Accordingly, a device design will typically have a plurality of clock domains.

As stated above, different parts of a design may be driven by different power sources. Additionally, different parts of a design may operate at different voltage levels. Furthermore, portions of a design may operate at different voltage levels at different times during the operation of the device. Accordingly, these portions of the design will be switched between different voltage levels. Often this switching takes place dynamically as described by the power component 207 of the device design 201. The act of switching the voltage levels is often referred to as "power switching," "voltage switching," or simply "switching." The set of all clock domains that are always switched together is referred to herein as a "voltage domain".

As further stated above, different parts of the design are powered on and off dynamically. Each sub-portion of these different parts of the design may operate at different voltage levels. The set of all voltage domains that are always powered on and off together is referred to herein as a "power domain". Returning to FIG. 2, as stated above, the power controller component 207 describes logic that controls the switching of power and voltages to the different parts of the design. The power component 205 specifies intended behavior of the different power and voltage domains.

Formal Verification Directives and Properties

Returning to FIG. 1, as detailed above, the set of directives 109 are checks of various ones of the properties 107 that relate to the device design 103. Particularly, the directives relate to various elements within the hardware component 203 of the device design. In various implementations of the invention, ones of the directives 109 will be "clocking directives." As used herein, clocking directives are directives that apply to properties of a clock domain or clock domains. In various implementations, the clocking directive specifies a peak number of register transitions for a given clock domain. Subsequently, an estimate of a lower bound of the peak dynamic power needed for that domain may be estimated, by for example determining the number of register transitions within the given clock domain.

As detailed above, device functionality depends upon whether the clocks continue to "tick." Accordingly, scenarios where low power optimization and clock gating conditions make a clock stop ticking are of particular interest. In various implementations, ones of the set of directives 109 specify that a clock for a particular domain ticks faster than another domain. With various implementations, ones of the set of directives 109 specify that if a clock in a particular domain is ticking then another clock in an alternate domain must tick.

In various implementations, ones of the set of directives 109 will be "voltage directives." As used herein, voltage directives are directives that apply to properties of a voltage domain or voltage domains. In some implementations, electronic signals defined by the design 103, which transition the voltage domains, go through level shifters. If the level shifter is such that its lower voltage end is fixed, then it is often desirable that the domain connected to that end of the level shifter be at a lower voltage that the signal as the system dynamically switches through voltage transitions targeted for lower power. Accordingly, a voltage directive may be defined to verify such operation. With some implementations, ones of the set of directives are "power directives" and apply to properties of the power domains. Various power directives may verify that the power domains turn on and off in correct sequence.

Those of skill in the art can appreciate that in formal verification, properties and directives are used in conjunction with each other to verify a design. More particularly, directives, which are sometimes referred to as verification statements, are instructions that specify what to do with the properties. For example, a simple directive is assert property (a ##1 b). The directive is an assert directive, which instructs the verification tool to verify that the property statement holds. In this case the tool is instructed to verify that every occurrence of a is followed by b. Accordingly, the both properties and verification directives are needed to form a complete formal verification specification.

As stated above, various languages exist for defining the properties and directives that make up the specification. One such language is the system verilog assertion language. Most languages used to define properties and directives can be translated into a temporal logic form, such as for example linear temporal logic. Linear temporal logic is a modal form of temporal logic, where the modalities refer to time. Linear temporal logic is built from a set of proportional variables, logical connections, and modal operators. For example, X pv1 states that the variable pv1 has to hold until the next state. Additionally, pv1 U pv2 states that variable pv1 has to hold at least until pv2. Furthermore, various operators may be classified as "weak" or "strong". As used herein a strong operator requires that the terminating condition (i.e. the occurrence of pv2 in the above example) occur. Often, a strong operation may be indicated by the ! symbol, for example, pv1 until! pv2. An example of a weak operator is pv1 W pv2, which is the equivalent of (pv1 Upv2)VGpv1, which means that either pv1 has to hold at least until pv2 or pv1 holds indefinitely.

In addition to the weak and strong operators. Linear temporal logic properties of "liveness" and "safety" are often used. The safety property specifies that "nothing bad happens," while the liveness property specifies that "something good will happen." In general these two properties are actually aspects of the properties and directives of the specification. The details of performing formal verification by using liveness and safety properties are familiar to those of skill in the art and as such will not be further covered in detail here.

Illustrative Computing Environment

Figure 4:
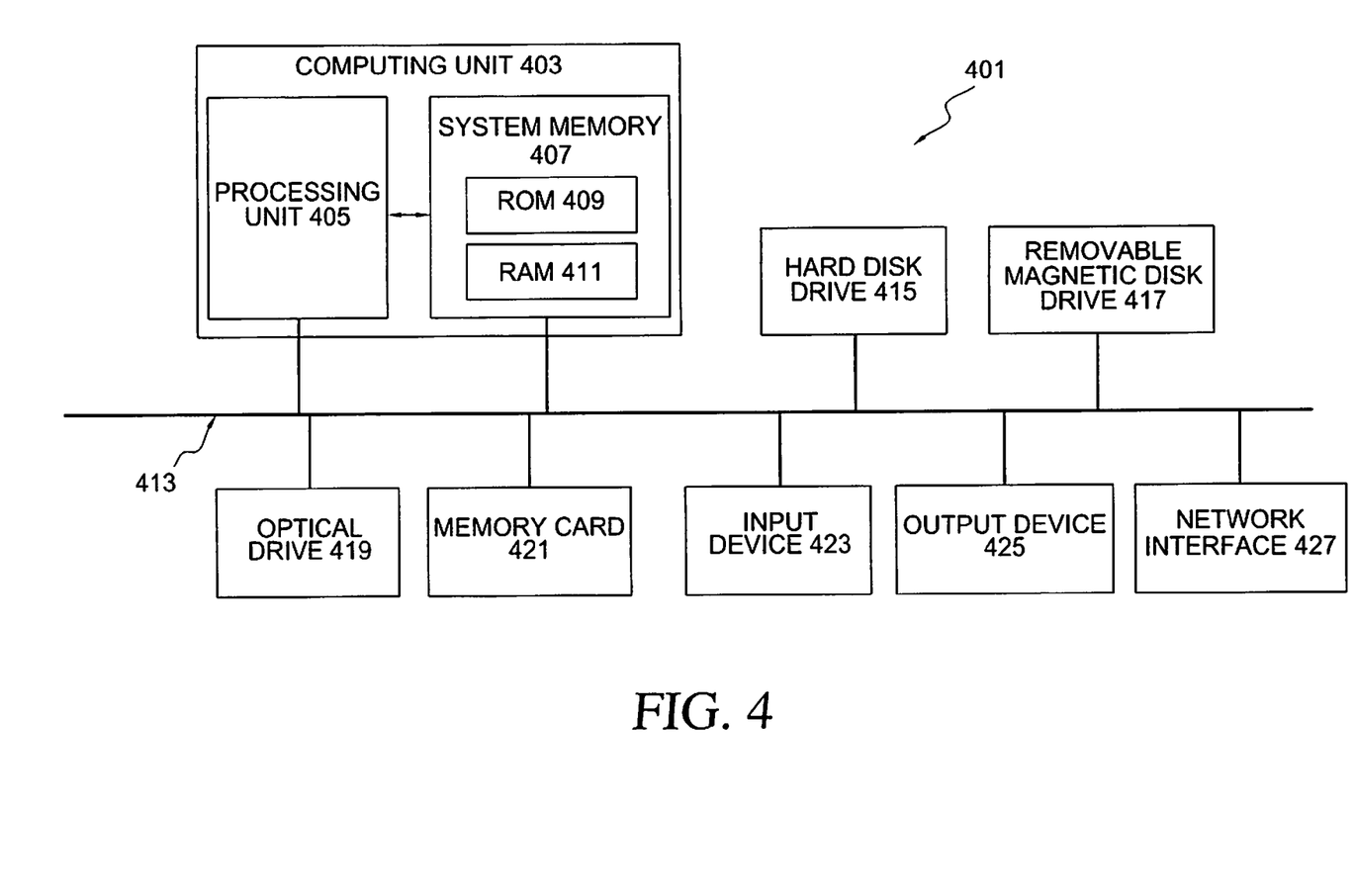
FIG. 4 shows an illustrative computing device

As the techniques of the present invention may be implemented using software instructions, the components and operation of a generic programmable computer system on which various implementations of the invention may be employed is described. Accordingly, FIG. 4 shows an illustrative example of a computing device 401. As seen in this figure, the computing device 401 includes a computing unit 403 with a processing unit 405 and a system memory 407. The processing unit 405 may be any type of programmable electronic device for executing software instructions, but will conventionally be a microprocessor. The system memory 407 may include both a read-only memory (ROM) 409 and a random access memory (RAM) 411. As will be appreciated by those of ordinary skill in the art, both the read-only memory (ROM) 409 and the random access memory (RAM) 411 may store software instructions for execution by the processing unit 405.

The processing unit 405 and the system memory 407 are connected, either directly or indirectly, through a bus 413 or alternate communication structure, to one or more peripheral devices. For example, the processing unit 405 or the system memory 407 may be directly or indirectly connected to one or more additional memory storage devices, such as a "hard" magnetic disk drive 415, a removable magnetic disk drive 417, an optical disk drive 419, or a flash memory card 421. The processing unit 405 and the system memory 407 also may be directly or indirectly connected to one or more input devices 423 and one or more output devices 425. The input devices 423 may include, for example, a keyboard, a pointing device (such as a mouse, touchpad, stylus, trackball, or joystick), a scanner, a camera, and a microphone. The output devices 425 may include, for example, a monitor display, a printer and speakers. With various examples of the computer 401, one or more of the peripheral devices 415-425 may be internally housed with the computing unit 403. Alternately, one or more of the peripheral devices 415-425 may be external to the housing for the computing unit 403 and connected to the bus 413 through, for example, a Universal Serial Bus (USB) connection.

With some implementations, the computing unit 403 may be directly or indirectly connected to one or more network interfaces 427 for communicating with other devices making up a network. The network interface 427 translates data and control signals from the computing unit 403 into network messages according to one or more communication protocols, such as the transmission control protocol (TCP) and the Internet protocol (IP). Also, the interface 427 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 401 is illustrated as an example only, and it not intended to be limiting. Various embodiments of the invention may be implemented using one or more computing devices that include the components of the computer 401 illustrated in FIG. 4, which include only a subset of the components illustrated in FIG. 4, or which include an alternate combination of components, including components that are not shown in FIG. 4. For example, various embodiments of the invention may be implemented using a multi-processor computer, a plurality of single and/or multiprocessor computers arranged into a network, or some combination of both.

Auxiliary Verification Directive Generation

As stated above, various implementations of the invention may be employed to generate auxiliary verification properties. More particularly, the auxiliary verification properties define intended power state transitions for the device design. These auxiliary verification properties may then be used in conjunction with the specification to perform formally verify that the device design does not have any unintended errors due to improper power state transitions. Generation of auxiliary verification properties will be further described by reference to FIG. 5, FIG. 6, and FIG. 7.

Figure 5:
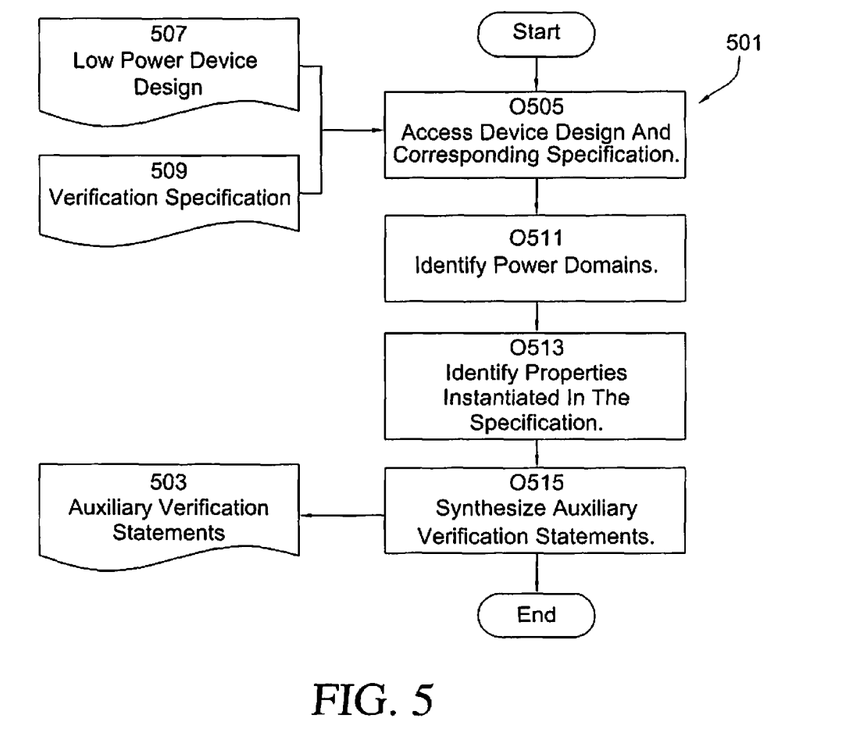
FIG. 5 illustrates a method of generating an auxiliary verification property.

FIG. 5 illustrates a method 501 that may be implemented according to various embodiments of the present invention to generate a set of auxiliary verification properties 503. The method 501 includes an operation 505 for accessing a device design 507. Having a plurality of power domains. The method 501 further includes an operation 509 for determining a set of properties instantiated in a specification 511 that corresponds to the device design 507, and an operation 513 for synthesizing the set of auxiliary verification properties 503. In various implementations, an auxiliary verification property is synthesized for each property instantiated in the specification 511.

In various implementations of the present invention, the device design 507 is described by a hardware description language. Accordingly, the device design 507 and all subcomponents of the device design 507, such as for example the power controller, will be synthesizable by various industry tools. With some implementations, the device design 507 has power information described in the unified power format. With various further implementations, the specification uses strong operators to describe the desired behavior of the device design 507.

Figure 6:
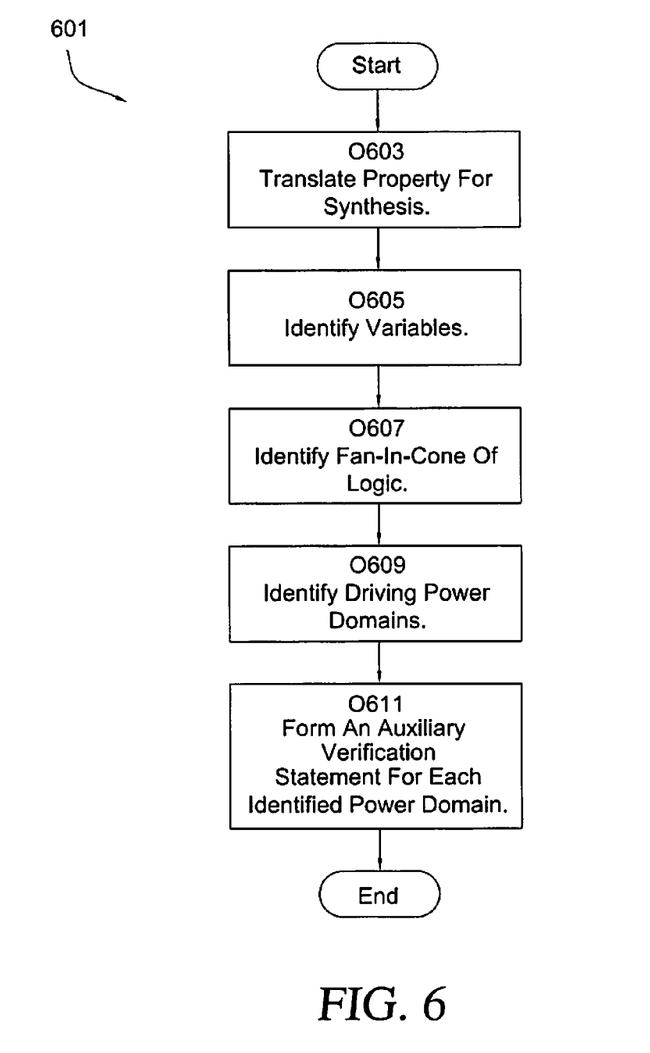
FIG. 6 illustrates the method of FIG. 5 in greater detail.

FIG. 6 illustrates a method 601 for synthesizing an auxiliary verification property. In various implementations, the operation 513 performs the method 601. As can be seen from FIG. 6, the method 601 includes an operation 603 for translating a property P. With some implementations, P is translated into the linear temporal logic form. With further implementations, P is translated into linear temporal logic form having a single until operator. With still further implementations, the single until operator is positive. More particularly, the occurrence of the anticipated variable is not negated in P. The method 601 additionally includes an operation 605 for identifying a set of variables p and q, such that p U q occurs in P.

The method 601 further includes an operation 607 for identifying the "fan-in-cone" of logic for q and an operation 609 for identifying the power domains that drive q. In various implementations, the operation 607 identifies the elements of the device design 507 that are logically connected to variable q. With various implementations of the invention, the operation 607 identifies the elements of the device design 507 that are immediately connected to the variable q. With further implementations, the operation 609 identifies the power domains that immediately drive the elements identified by the operation 607. Subsequently, an operation 611 for forming an auxiliary verification property for each identified power domain may be performed.

Figure 7:
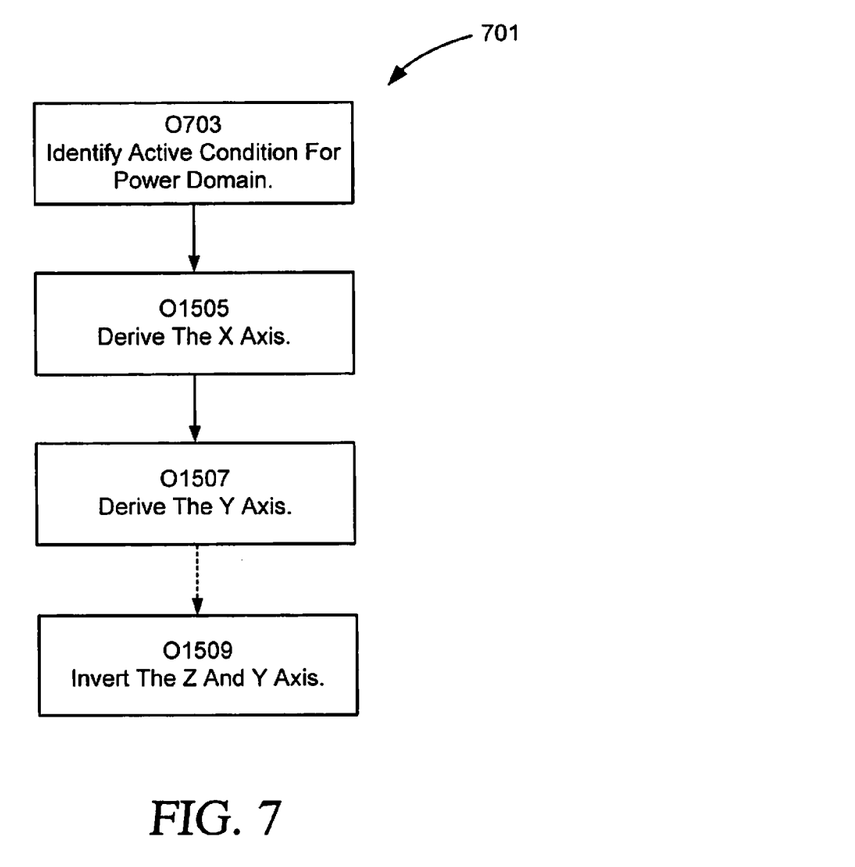
FIG. 7 illustrates the method of FIG. 6 in greater detail.

With various implementations, the operation 611 forms an auxiliary verification directive according to the method 701 of FIG. 7. In various implementations, an auxiliary verification property Pd will be generated for each power domain d within the set of identified power domains D. As can be seen from this figure, the method 701 includes an operation 703 for identifying a condition c that indicates d is in the "active" power state. In various implementations, the operation 703 identifies the condition c from the power controller portion of the device design. For example by synthesizing the hardware description language such that the condition c may be derived. The method 701 further includes an operation 705 for constructing the property Pd. In various implementations of the invention, Pd is c W q.

Illustrative Application

Figure 8:
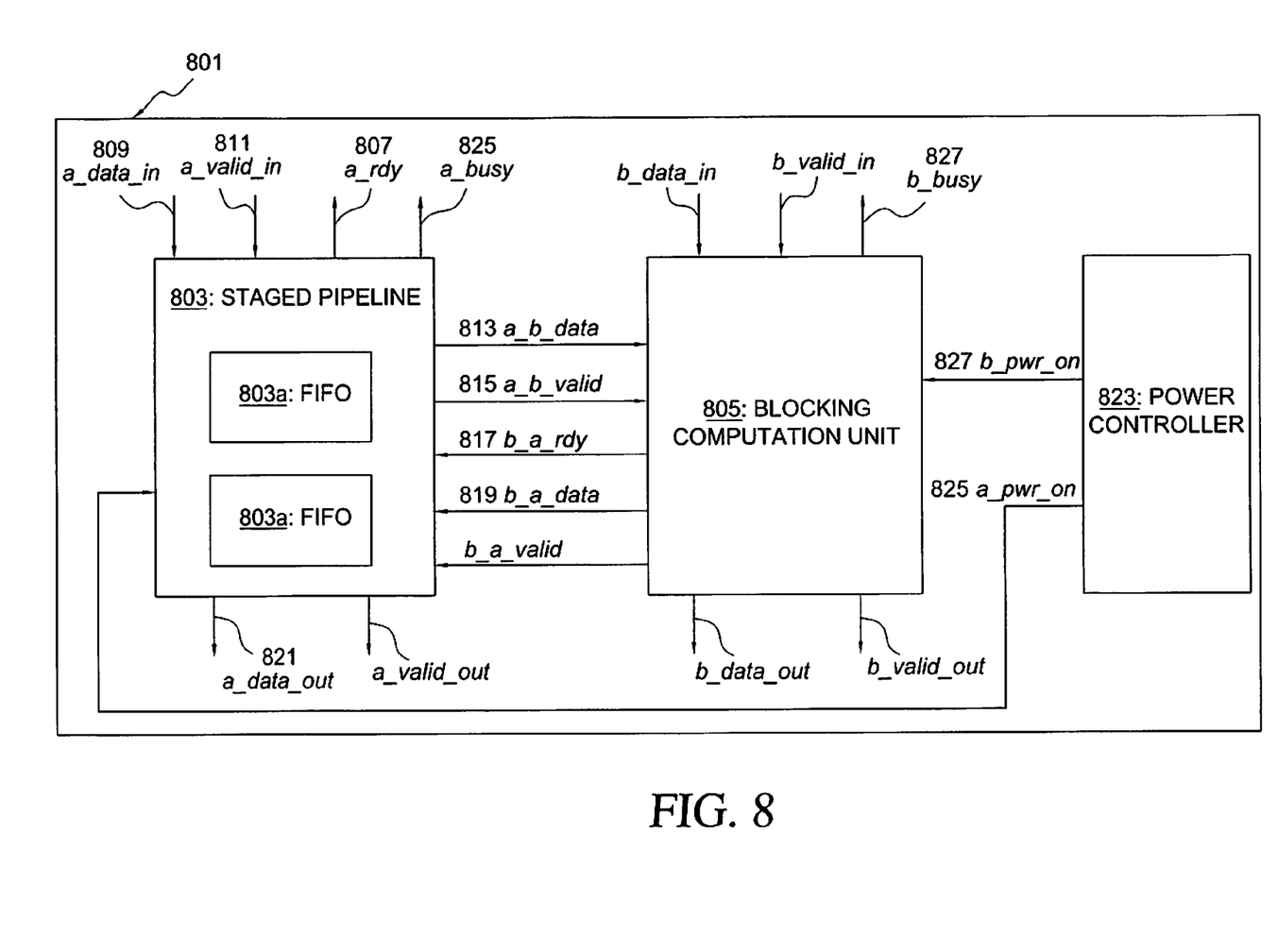
FIG. 8 illustrates an electronic system.

FIG. 8 illustrates an example system 801. As can be seen from this figure, the system 801 includes a first module 803 and a second module 805. The first module 803 is a staged pipeline for processing incoming data. For certain data, the first module needs the second module 805 to compute a blocking computation, which causes the first module 803 to stall. As can be seen from this figure, the first module 803 includes first in first out (FIFO) buffers such that data is not lost during the stall and provide for a return to full performance after the stall.

As can be further seen from this figure, the first module has an output a_rdy (i.e. 807), which indicates when it is ready to accept data. Valid data is send to the first module 803 on the input a_data_in (i.e. 809), while keeping its input a_valid_in (i.e. 811) high. As stated, some of the data needs to be processed by the second module 805. In order to send data to on the line a_b_data (i.e. 813), the first module needs to drive the line a_b_valid (i.e. 815) high and wait till the line b_a_rdy (i.e. 817) is high. Once the first module 803 sends the data along the line 813, the second module 805 performs the blocking computation and after several cycles sends the computed data back on the line b_a_data (i.e. 819). The first module 803 receives the data coming from the second module 805 and other data through the pipeline and provides it its output a_data_out (i.e. 821).

Verification of this example is first described without reference to a power controller. Accordingly, the first module 803 and the second module 805 would be in the same power domain. A portion of a specification may be defined that constrains the inputs so that valid inputs do not come in when it either module is not ready or when either module is in a reset state. The following are illustrative assumptions, written in the property specification language format.

```
assume always
    (!a_rdy->!a_valid_in);
assume always
    (a_rst ->!a_valid_in);
assume always
    (a_sign->!a_data_in[WIDTH-1]);
assume always
    (a_sign->next !rst);
```

Given the data stream 0h8f on a_data_in, the data stream 0hff should eventually be seen at a_data_out. This behavior may be checked by the following assertion, also written in the property specification language format.

```
assert always (
    ((a_valid_in && (a_data_in == 'h8f))
    ->
    ((next a_sign) until!
    (a_data_out == 'hff))) abort a_rst);
```

We then defined ma and mb to be in different power domains, and implemented a power controller, that drives outputs a_pwr_on and b_pwr_on. The power controller keeps track of a_busy and b_busy which are driven low when the respective modules ma and mb are not busy, and when a module is not found to be busy for a given number of cycles, switches that off Using the vitality detection algorithm, auxiliary assertions generated are given by the following PSL.

Figure 9:
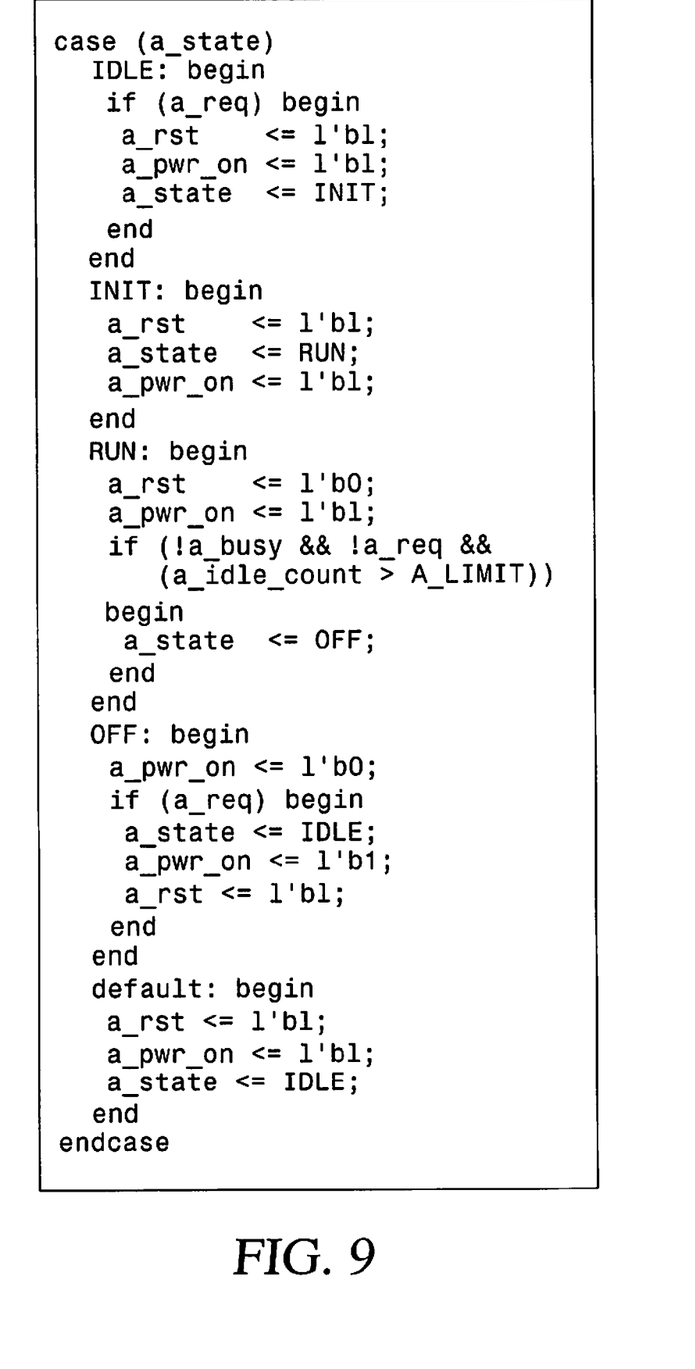
FIG. 9 illustrates a description of a portion of the electronic system of FIG. 8.
Figure 10:
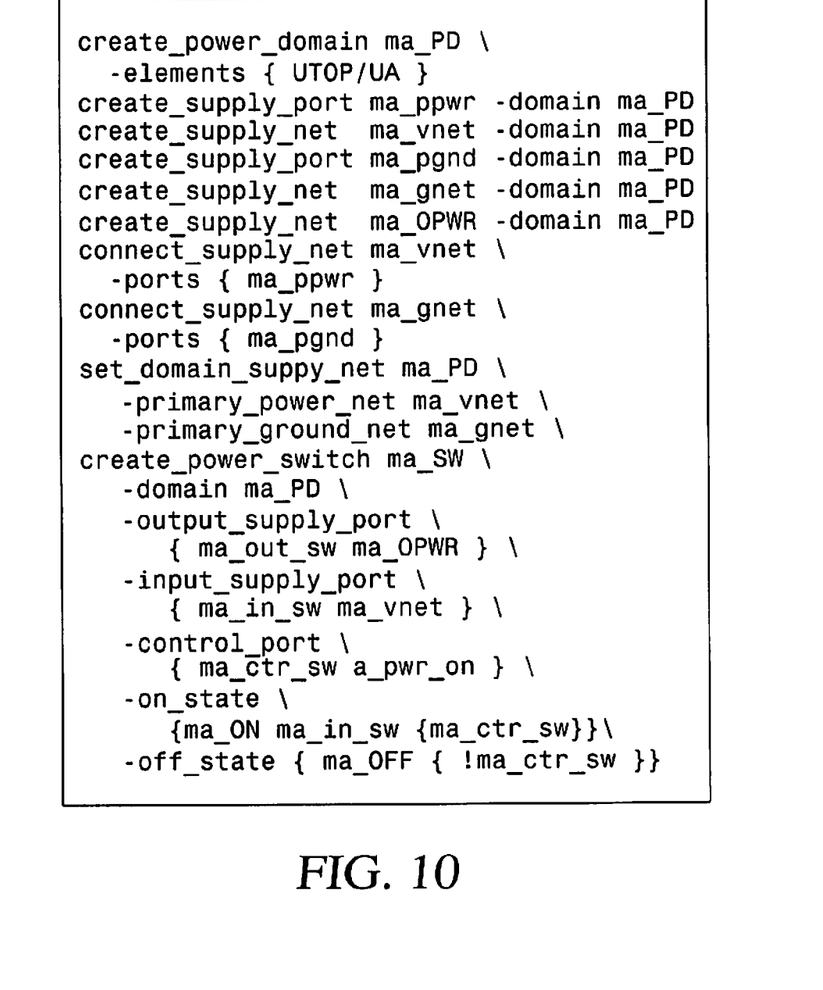
FIG. 10 illustrates a description of the power domains of the electronic system of FIG. 8.

As can be further seen from FIG. 8, the system 801 includes a power controller 823. FIG. 9 illustrates description for the power controller 823 written in the hardware description language Verilog. The power controller controls the power to the first module 803 and the second module 805 by driving its outputs a_pwr_on and b_pwr_on. FIG. 10 illustrates a portion of the power description of the system 801, in the unified power format. As shown in this figure, the power domain for the first module 803 is illustrated. As those of skill in the art are capable of deducing the power description for the second module 805 based on FIG. 10, it is not described here. As can be seen from FIG. 9 and FIG. 10, the first module 803 and the second module 805 are in different power domains. As further illustrated in FIG. 9 and FIG. 10, the power controller 823 monitors the outputs a_busy (i.e. 825) and b_busy (i.e. 827), which are driven low when the respective modules are not busy. The power controller 823 switches a particular module off when that module has been found to be not busy for a selected number of cycles.

As the first module 803 and the second module 805 are now defined to be in different power domains, it is possible that they may be switched at different times during the operation of the system 801. Accordingly, the module 803 may be turned off when the module 805 is performing the blocking computation, resulting in a disruption of the pipeline.

The following auxiliary properties may be employed to check the correct operation of the system 801, given the description of the power domains and power controller 823.

```
assert always (
    ((a_valid_in && (a_data_in == 'h8f))
    ->
    (b_pwr_on until
    (a_data_out == 'hff))) abort a_rst);
assert always (
    ((a_valid_in && (a_data_in == 'h8f))
    ->
    (a_pwr_on until
    (a_data_out == 'hff))) abort a_rst);
```

In various implementations of the present invention, the method 501 may be employed to generate the auxiliary verification statements described above.

Figure 11A:
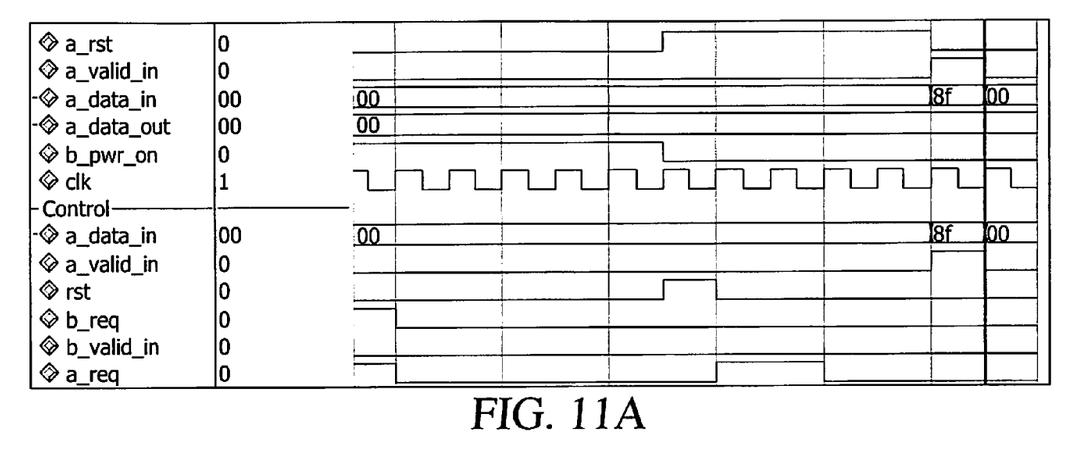
FIG. 11A illustrates logic states for the electronic system of FIG. 8.
Figure 11B:
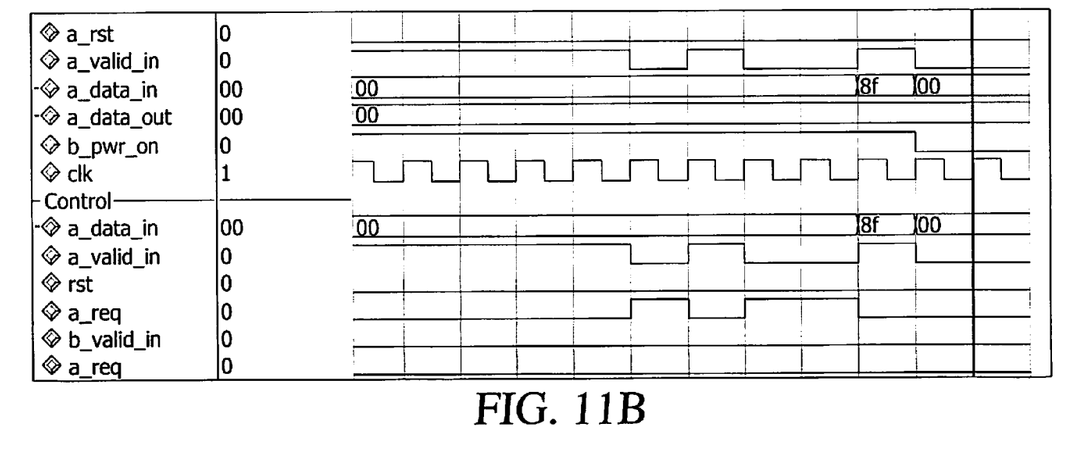
FIG. 11B illustrates logic states for the electronic system of FIG. 8.

FIGS. 11A and 11B illustrates undesirable power state transitions that would not be detected by the original assertions, but are detected by the auxiliary properties illustrated above. FIG. 11A illustrates the condition where the second module 805 is powered down before data arrives at the first module 803, while FIG. 11B illustrates the condition where the second module 805 is powered down after data arrives at the first module 803.

CONCLUSION

Various techniques for verifying power state transitions within a device design have been described. Particularly, techniques for generating an auxiliary verification statement have been detailed. In various implementations of the invention, a device design having multiple power domains is identified. Additionally, a verification statement corresponding to the device design is identified. Subsequently, an auxiliary verification statement defining properties to check if the power domains are active at appropriate times is generated. The auxiliary verification statement may be used in conjunction with the verification statement to verify correct operation of the device design. Particularly, the auxiliary verification statement may be used to ensure that the power domain transitions do not interfere with the operation of the device design.

With various implementations of the invention, an auxiliary verification statement may be generated by first determining a set of properties instantiated in a verification statement and then synthesizing the auxiliary verification statement based upon the determined properties, the corresponding device design and the power domains. In some implementations, the auxiliary verification statement instantiates properties that check if the power domains related to the properties in the verification statement are active when the verifications statement is exercised. In various implementations, this is accomplished by substituting select ones of the properties in the verification statement with select properties corresponding to the power domain.

Although certain devices and methods have been described above in terms of the illustrative embodiments, the person of ordinary skill in the art will recognize that other embodiments, examples, substitutions, modification and alterations are possible. It is intended that the following claims cover such other embodiments, examples, substitutions, modifications and alterations within the spirit and scope of the claims.

What is claimed is:

1. A computer implemented method for deriving a set of auxiliary verification statements comprising:
   accessing by a computer a device design, the device design having a plurality of power domains;
   accessing by the computer at least one verification statement;
   determining on the computer a set of properties instantiated in the at least one verification statement;
   synthesizing on the computer a set of auxiliary verification statements, the auxiliary verification statements corresponding to the set of properties and the plurality of power domains, wherein synthesizing the set of auxiliary verification statements comprising:
      for ones of the set of properties,
         determining on the computer a plurality of driving power domains corresponding to the property, the plurality of driving power domains being a subset of the plurality of power domains; and
      for the plurality of driving power domains,
         determining a condition wherein the driving power domain is active,
         generating an auxiliary property based on the condition and the property,
         generating an auxiliary verification statement based on the auxiliary property, and
         adding the auxiliary verification statement to the set of auxiliary verification statements; and
   saving the set of auxiliary verification statements to a memory storage location.

2. The computer implemented method recited in claim 1, the property being of the linear temporal logic form pv1 U pv2, where pv represents a proportional variable.

3. The computer implemented method recited in claim 2, the auxiliary property being of the linear temporal logic form pv3 U pv2, where pv3 represents the condition.

4. The computer implemented method recited in claim 3, further comprising:
   making the set of auxiliary verification statements available to a formal verification engine.

5. The computer implemented method recited in claim 4, the device design having a plurality of design elements and the method act of determining on the computer a plurality of driving power domains corresponding to the property comprising:
- identifying on the computer the design elements from the plurality of design elements corresponding to the proportional variables; and
- identifying on the computer the power domains from the plurality of power domains corresponding to the identified design elements; and
- defining the identified power domains as the plurality of driving power domains.

6. The computer implemented method recited in claim 2, wherein the property is of the linear temporal logic form X! pv1, where pv represents a proportional variable.

7. The computer implemented method recited in claim 6, the auxiliary property being of the linear temporal logic form X pv3, where pv3 represents the condition.

8. An apparatus comprising at least one computer-readable memory device storing instructions configured to cause one or more processing devices to perform operations comprising:
- identifying a property instantiated in a verification statement;
- synthesizing an auxiliary verification statement corresponding to the property and a plurality of power domains of a device design, wherein synthesizing the auxiliary verification statement comprising:
  - determining one or more driving power domains of a device design that correspond to the property;
  - determining a condition wherein the driving power domains are active;
  - generating an auxiliary property based on the condition and the property; and
  - generating the auxiliary verification statement based on the auxiliary property.

9. The apparatus of claim 8, wherein the property has a linear temporal logic form pv1 U pv2, where pv represents a proportional variable.

10. The apparatus of claim 9, wherein the auxiliary property has a linear temporal logic form pv3 U pv2, where pv3 represents the condition.

11. The apparatus of claim 10, further comprising rendering the auxiliary verification statement available to a formal verification engine.

12. The apparatus of claim 11, wherein the device design includes a plurality of design elements, and wherein determining the driving power domains that correspond to the property further comprises:
- identifying a set of design elements that correspond to the proportional variable of the property; and
- identifying one or more power domains in the device design that correspond to the identified design elements; and
- defining the identified power domains as the driving power domains.

13. The apparatus of claim 9, wherein the property has a linear temporal logic form X! pv1, where pv represents a proportional variable.

14. The apparatus of claim 13, wherein the auxiliary property has a linear temporal logic form X pv3, where pv3 represents the condition.

* * * * *